Aug. 2, 1966    C. N. SJOGREN    3,263,337
METHOD AND APPARATUS FOR DEHYDRATING FOAM
Filed Jan. 8, 1962    5 Sheets-Sheet 2
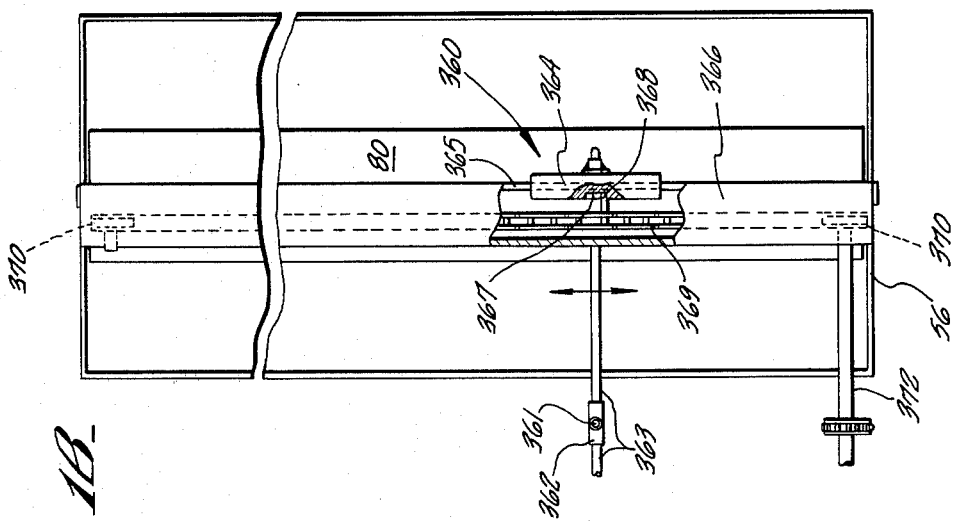
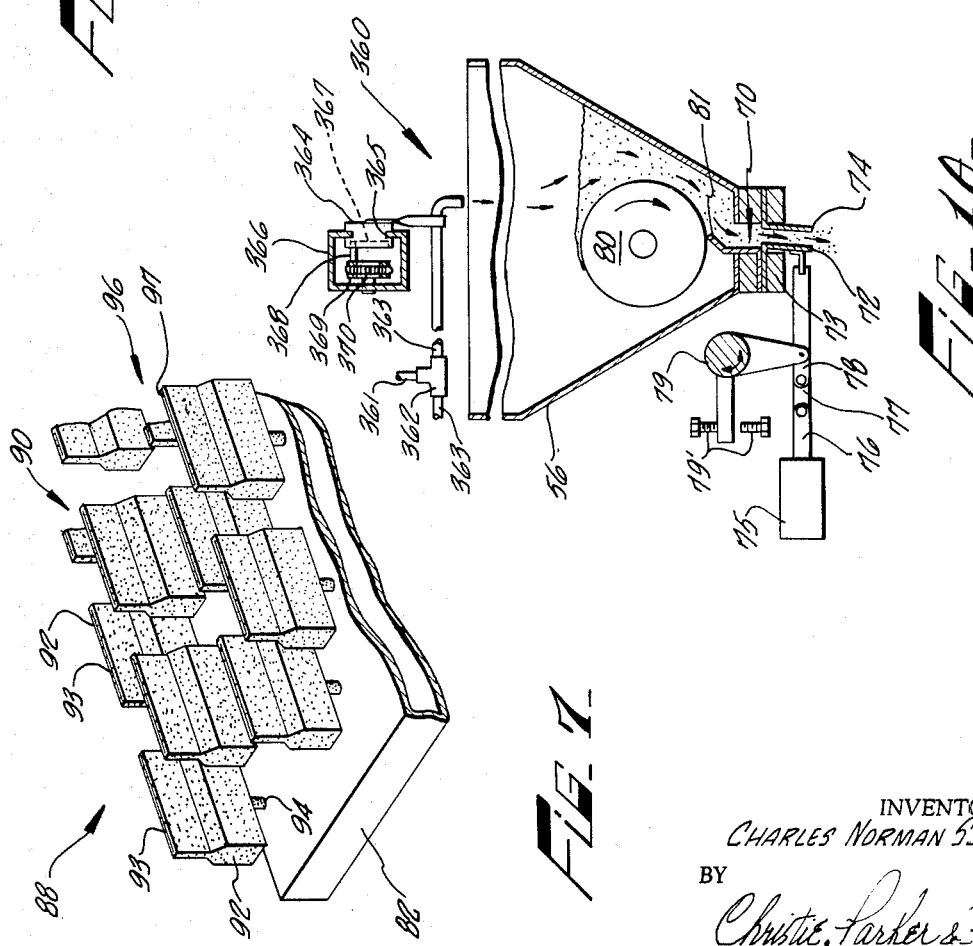
INVENTOR.
CHARLES NORMAN SJOGREN
BY
Christie, Parker & Hale
ATTORNEYS

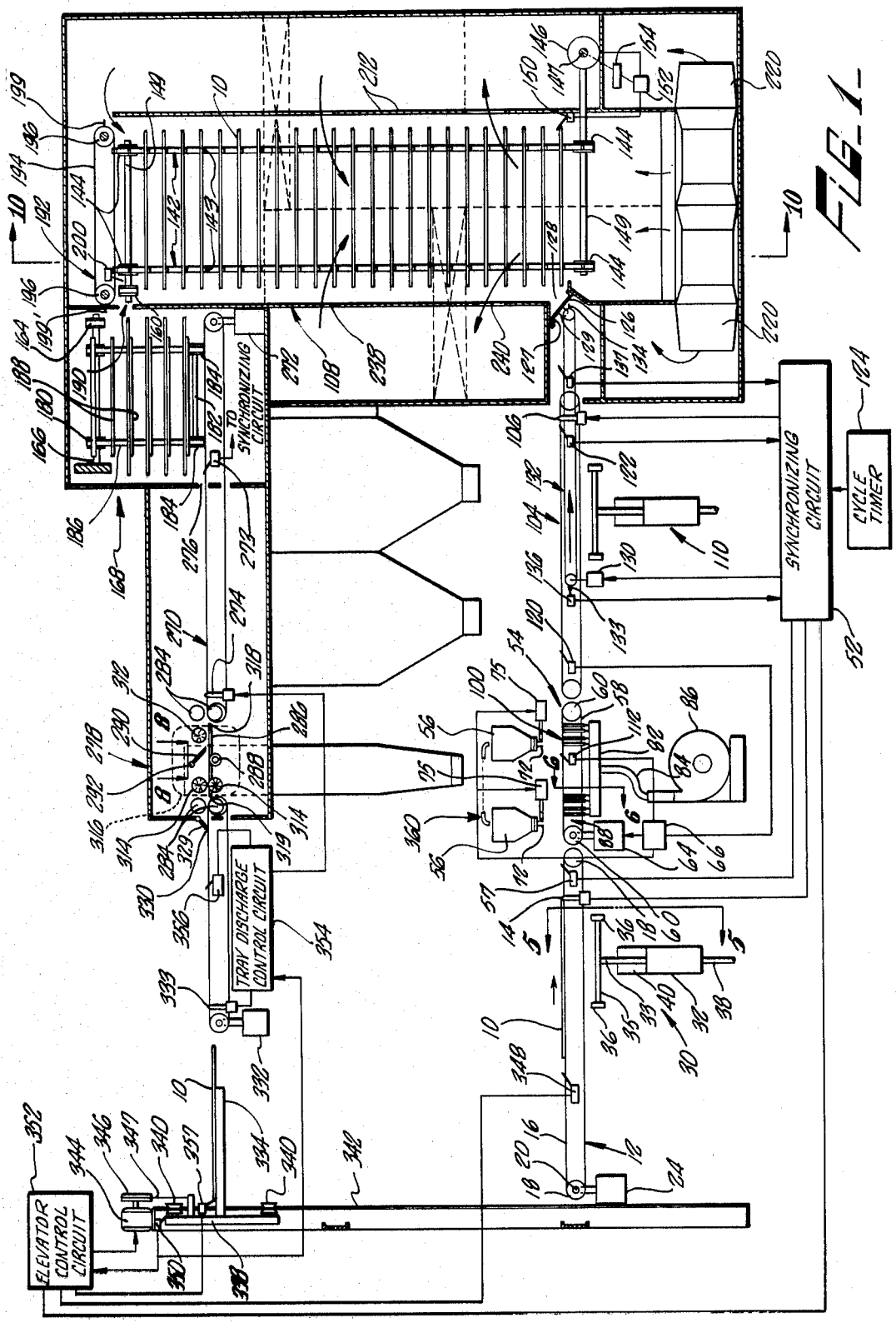

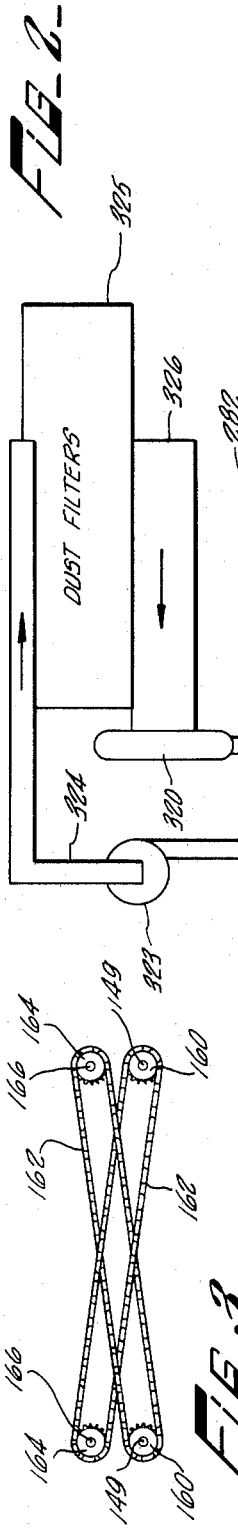

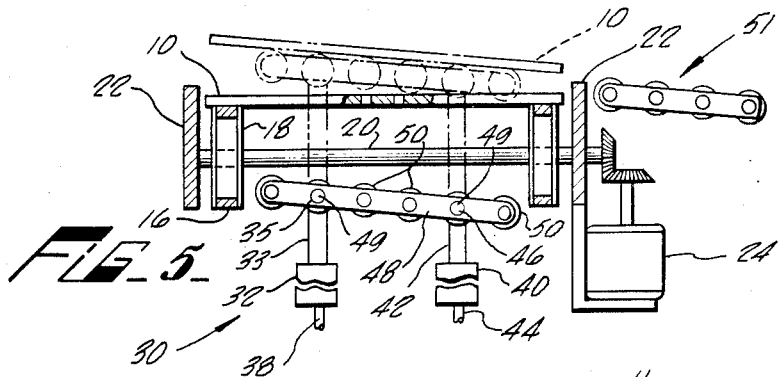
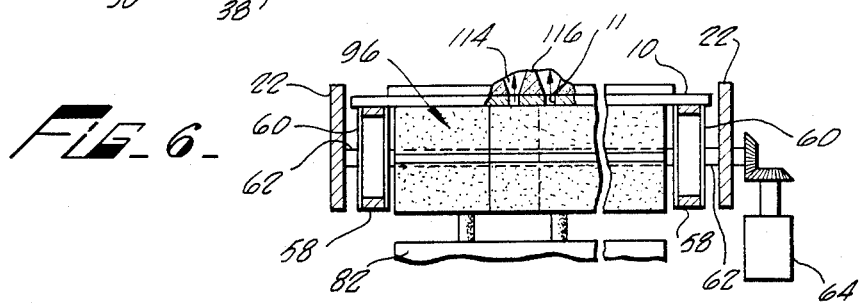
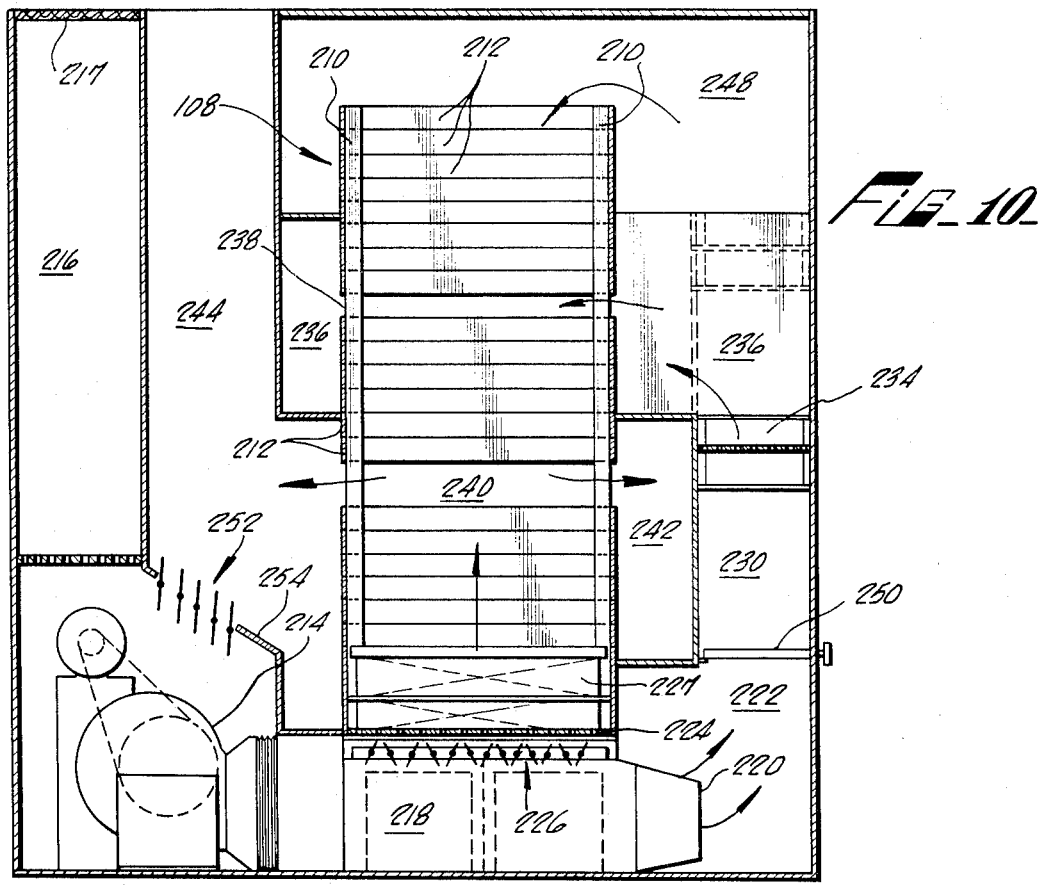

3,263,337
METHOD AND APPARATUS FOR
DEHYDRATING FOAM
Charles Norman Sjogren, San Gabriel, Calif., assignor, by mesne assignments, to Chemet Enterprises, Pasadena, Calif., a limited partnership
Filed Jan. 8, 1962, Ser. No. 164,897
5 Claims. (Cl. 34—31)

This invention provides method and apparatus for drying a wide range of materials, including chemical compounds and food concentrates, such as fruits, vegetables, meats, and beverages.

In one important application, the invention provides for the drying of fruit and vegetable concentrates in a manner that retains most, if not all, of the original flavor and aroma. This is a marked improvement over drying methods currently available such as spray dryers, drum dryers, belt dryers, vacuum belt dryers, tray dryers, and the like.

U.S. Patent 2,981,629 discloses a system for dehydrating a foam of solids and liquids. In the patented technique, a mat of foam is spread over perforated trays, and a gas is forced through the perforations at a velocity sufficient to cause portions of the mat overlying the perforations to be displaced, thereby producing a perforated mat of foam. Thereafter, the perforated foam mat is dried.

So far as the applicant is aware, the patented technique has not been sufficiently developed to provide a commercial process. This invention provides the first commercial process for continuous drying of dissolved or undissolved solids in the form of a perforated foam.

Briefly, the invention includes a foam mat spreading and perforating station, a drying chamber for removing moisture from the perforated foam mat, a cooling chamber for reducing the temperature of the dried foam mat, a product removal station for dislodging the dried solids from perforated trays, and return apparatus for recycling the trays or other perforated bodies on which the foam is spead.

At the foam spreading station, preferably an elongated conveyor carries a plurality of perforated trays serially under a plurality of foam hoppers disposed over the conveyor and spaced longitudinally along it. Each hopper has in its bottom an elongated orifice that extends transverse to the longitudinal direction of the conveyor. The forward edge of a tray is brought under a respective orifice in a hopper, so that one or more hoppers are disposed over the tray. As the tray moves forward under the respective orifices, a foam mat of dissolved or undissolved solids and liquid is spread simultaneously and uniformly over longitudinally spaced portions of the tray and perforations. In this way a relatively large area is covered with foam in a short time, even for relatively slow tray speed, which usually must be kept low for best spreading results.

After each foam spreading hopper, there are one or more orifices or gas jets for blowing gas through the perforations in the tray at a velocity sufficient to displace the portions of the foam mat overlying the perforations and produce a perforated or cratered mat of foam on each of the trays. Preferably the jets are located below the trays and are articulated and spring loaded toward the trays to insure good contact with the bottom of the trays.

The foam usually is about the consistency of shaving lather, and ordinarily must be spread and perforated at a rate which requires slower movement under the hoppers than is required for the trays throughout the rest of the system. Thus, the use of multiple spreaders in series produces a spreading capacity which matches the throughput rate for the rest of the system.

Preferably, the spreading system includes means for automatically rejecting trays both prior to and after the application of foam to prevent "dirty" trays or improperly perforated foam mats from passing through the rest of the system.

Apparatus for drying the perforated foam mats includes an upright drying chamber having vertically spaced entrance and exit openings. A conveyor in the drying chamber extends between the entrance and exit openings to move the perforated foam mats from the entrance to the exit of the drying chamber. Preferably a drying gas is flowed into the entrance end of the chamber concurrently with the movement of the perforated mats, and a stream of drying gas is blown into the exit end of the drying chamber countercurrently to the direction of foam mat movement. Preferably at least two separate countercurrent streams of gas are used in the drying zone.

In the preferred embodiment, the foam mats are moved stepwise through the drying chamber, and means are provided for adjusting the increments through which the mats are stepped. Preferably, the drying gas is passed through filters to insure a dust-free atmosphere for drying the product. Means are also provided for recirculating at least part of the gas to obtain optimum humidity conditions and to reduce loss of aroma and flavor when the feed to the dryer is a food concentrate. When the temperature of the drying gas is not sufficiently hot to insure sterile air, biological filters are preferably used to provide a germ-free drying atmosphere.

A cooling chamber has an entrance opening communicating with the exit of the drying chamber, and also includes the exit opening which discharges into a product removal zone. Means are provided in the cooling chamber to move dried foam mats from the entrance to the exit openings. Means are also provided for flowing a cooling gas to reduce the temperature of the dried foam mats.

Preferably, the gas flow in the cooling chamber is countercurrent to the direction of movement of the foam mats through the cooling chamber. The cooling gas is also preferably an inert one, such as nitrogen, which is recycled for the sake of economy. Means are provided for cooling and dehumidifying the recycled cooling gas. The use of an inert gas is preferred to air in the cooling chamber to reduce the amount of oxygen that would otherwise be adsorbed by the porous dried product if exposed to the atmosphere. For the purpose of this invention, the term "inert gas" is used to mean any gas which does not have a deleterious effect on the product. For example, many food products are adversely affected by oxygen or other oxidizing agents, and therefore an inert gas includes one which is free of oxidants. Examples of inert gases are nitrogen, methane, ethane, butane, carbon dioxide, carbon monoxide, nitrous oxide, hydrogen, and helium.

In the product removal zone, the trays with the cooled and dried foam mats are moved past a doctor blade which scrapes most of the product from the trays. Thereafter, the trays are moved past a rotary brush which dislodges any remaining dried solids from the trays. In many types of drying operations, the dried foam mat may have a light crust on its upper surface. In such cases, it is preferable to scratch, or otherwise break up, the surface crust prior to removal with the doctor blade to prevent the formation of flaky particles which are too large for good compaction required for space economy in product storage and shipping. This is preferably done by a fixed rake or a rotating brush with bristles set at appropriate intervals.

Preferably, the doctor blade is reciprocated in a direction transverse to the movement of the dried foam mat past it to cut off the product rather than to scrape or push it. The reciprocating action reduces the force required to remove material, and provides for more uniform wearing of the blades.

Preferably, the product removed from the trays is picked up in a gas stream, say an inert gas such as nitrogen, and separated at a remote location in a suitable cyclone separator and by dust filters. The pickup gas stream is also dehumidified. Preferably, a slight positive pressure is maintained in the pickup zone and cooling chamber to avoid the inleakage of ambient air, and thus maintain an inert atmosphere within both the cooling chamber and the product removal zone.

The clean trays leaving the product removal zone are automatically conveyed back to the beginning of the process for the application of fresh foam, and the foregoing procedure is repeated on a continuous basis.

These and other aspects of the invention will be more fully understood from the following detailed description in which:

FIG. 1 is a schematic sectional elevation of the presently preferred commercial embodiment of this invention;

FIGS. 1A and 1B are enlarged fragmentary views of a hopper used to spread foam;

FIG. 2 is a plan view, partly broken away, of the installation shown in FIG. 1 with the ducts for the drying chamber not shown;

FIG. 3 is a view taken on line 3—3 of FIG. 2;

FIG. 5 is a view taken on line 5—5 of FIG. 1;

FIG. 6 is a view taken on line 6—6 of FIG. 1;

FIG. 7 is a fragmentary perspective view of the gas jets shown in FIG. 6;

FIG. 10 is a view taken on line 10—10 of FIG. 1, with the tray lifting and transfer mechanism not shown.

Figure 4:
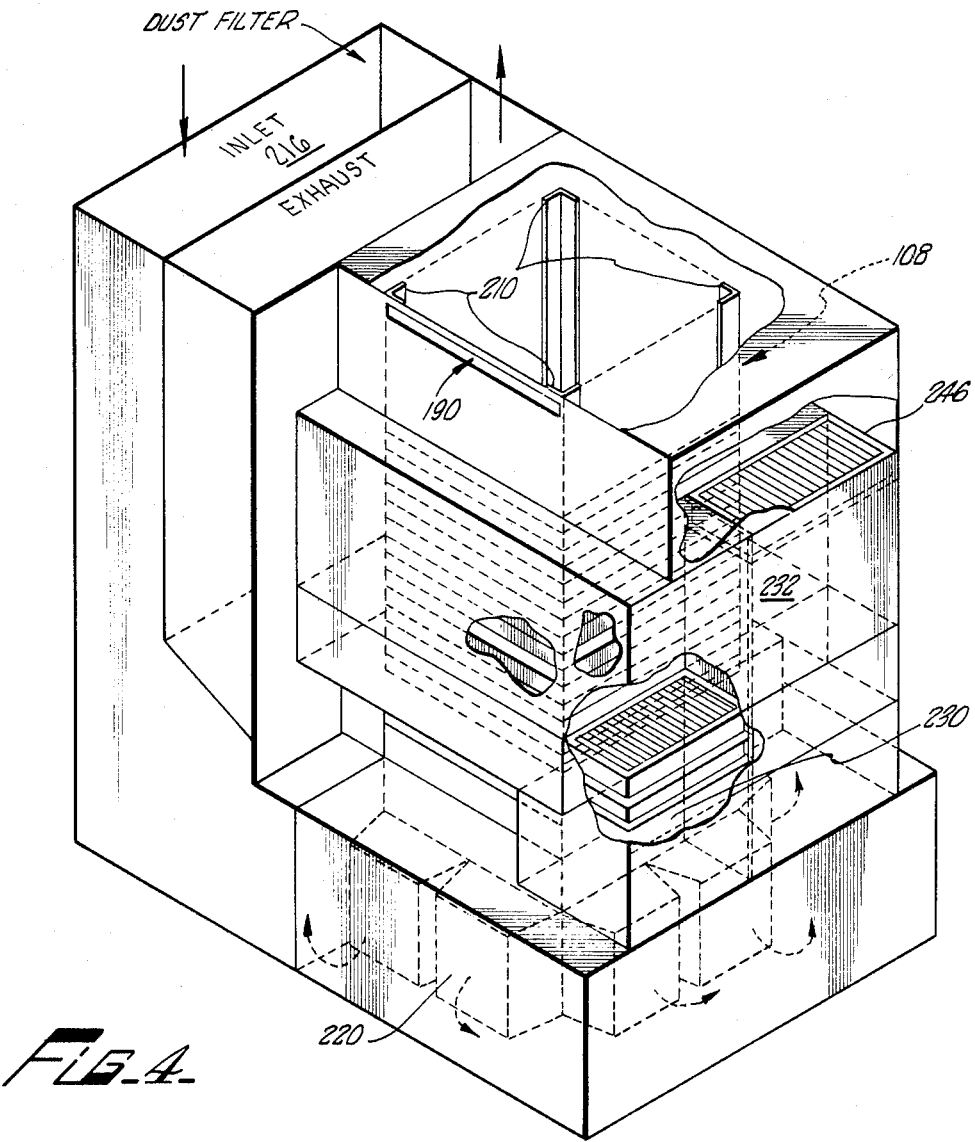
FIG. 4 is a perspective view, partly broken away, of the drying chamber.

Referring to FIG. 1, a flat tray 10 with perforations 11 is carried by an elongated horizontal clean tray conveyor 12 against a vertical solenoid-actuated stop 14 at the right end of the clean tray conveyor. As shown best in FIG. 5, the clean tray conveyor 12 (FIG. 1) is made up of a pair of laterally spaced endless belts 16 disposed around pulleys 18 mounted on horizontal and transverse shafts 20 secured to a pair of elongated and laterally spaced horizontal side plates 22. The clean tray conveyor is driven continuously at a constant speed by a clean tray conveyor motor 24 to carry a tray from left to right as indicated by the arrow in FIG. 1 against stop 14. After a tray comes to rest against the stop, the belts continue to slide under it.

A first tray rejector 30 (see FIG. 5) includes a long vertical cylinder 32 and a long vertical piston 33 extending out of the upper end of the cylinder 32 under the left (as viewed in FIG. 5) side of the clean tray conveyor. A longitudinal connecting bar 35 is secured at its center to the upper end of piston 33. Fluid is supplied to long cylinder 32 through a fluid line 38. A short vertical cylinder 40 (FIG. 5) is disposed under the right (as viewed in FIG. 5) side of the feeding conveyor directly opposite the long cylinder and includes an upwardly extending short vertical piston rod 42. Fluid is supplied to the lower end of a short cylinder 40 through a fluid supply line 44 to raise the piston 42. A longitudinal cross rod 46 is connected at its center to the upper end of piston rod 42, and a pair of transverse bars 48 (only one shown in FIG. 5) are connected by pivot pins 49 to the opposite ends of rods 35 and 46. A set of rollers 50 are mounted on each bar 48 to be rotatable about separate respective longitudinal axes. Thus, when fluid pressure is supplied through lines 38 and 44, piston rods 33 and 42 move upwardly. Piston rod 42 moves upwardly far enough to clear the right (as viewed in FIG. 5) side of the tray over the edge of the adjacent side plate 22. Since piston rod 33 is longer, the left side of the tray is eventually raised higher than the right side so that the tray tilts and slides off the rollers 50 onto a tray reject conveyor system 51 (FIG. 2) disposed adjacent the feed conveyor. The rejected trays are carried to an automatic tray washer (not shown) and returned clean to the tray conveyor by an automatic delivery system. In this way, trays which are not clean, or are otherwise unsatisfactory, may be rejected by an operator, and be replaced by clean trays.

When the solenoid-operated stop 14 (as shown in FIG. 1) is lowered by a signal from a synchronizing circuit 52 (as described in more detail below) a tray moves from left to right onto a two-speed conveyor 54 disposed under a pair of longitudinally spaced foam hoppers 56 at a foam spreading station. A limit switch 57 to the right of stop 14 prevents the stop from raising until the tray has cleared it.

The construction of the two-speed conveyor is similar to that of the clean tray conveyor, and is shown in FIG. 6. It includes a pair of elongated and laterally spaced endless belts 58 disposed around rotatable pulleys 60 on shafts 62 mounted on side plates 22. The two-speed conveyor pulleys are driven by a two-speed motor 64, the operation of which is determined by control circuit 66 described in more detail below. Alternatively, an electrically operated overdriving clutch (not shown) may be used instead of a two-speed motor.

Each foam hopper 56 (as shown in FIG. 1 and in greater detail in FIG. 1A) has a transverse elongated opening 70 at its bottom, which is opened and closed by an elongated inverted L-shaped flexible plate 72 secured at its upper edge by a clamp 73 to the bottom of one side of the hopper opening. Each plate 72 is moved back and forth against a respective opposing inverted L-shaped plate 74 through the operation of a respective solenoid 75, which is operated in response to signals from the control circuit 66. Each solenoid 75 includes a plunger 76 connected at one end by a pivot link 77 to one end of a push rod 78, the other end of which bears against flexible plate 72, which has a natural spring bias away from the opposing plate so the hopper is normally open. When solenoids 75 are energized, the respective movable plates 72 are forced against the opposing plates 74 to close the hopper opening. Each push rod 78 is connected to one end of a respective bell crank mounted on a rotatable shaft 79. The other end of the bell crank moves between two adjustable stop screws 79' which determine the opened and closed position of the movable plate 72.

Each hopper 56 also includes an internal transverse roller 80 disposed above the opening 70. A separate transverse doctor blade 81 is mounted in the bottom of each hopper on the left (as viewed in FIG. 1A) side of the opening to make a sliding fit against the lower portion of each roller and to seal the left side of each hopper from the respective hopper opening. The hopper rollers 80 are mounted to be rotated in a clockwise direction (as viewed in FIG. 1A) by conventional rotating means (not shown) which are turned on and off in conjunction with actuation of the solenoids 75 to force foam out of the hoppers.

As shown best in FIGS. 1A and 1B, the preferred embodiment of this invention includes a foam distributor system 360 for each hopper 56 to keep the foam level in the hoppers at a low but uniform position. Foam is pumped from a source (not shown) through a flexible delivery hose 361 to a T connection 362, the opposite ends of which are connected to respective supply line 363 which discharges into a respective one of the hoppers 56. The outer end of each line 363 is supported by a respective block 364 disposed to reciprocate transversely in an elongated groove 365 in a separate guide 366 over each hopper. Each block 364 has a vertical slot 367 in which rides a pusher tab 368 mounted on a chain 369 disposed around sprockets 370, which are driven by a drive shaft 372 supplied power from a conventional source (not shown). As the chains 369 are driven, the tabs force the blocks to reciprocate in their respective grooves, causing the discharge ends of the supply lines to move longitudinally over the hopper rollers and deposit a uniform layer of foam in the hoppers.

A plenum chamber 82 is disposed under the two-speed conveyor and is supplied a gas such as air or nitrogen through a line 84 from a blower 86. A first series of gas nozzles 88 are mounted at the left end of the plenum chamber just to the right of (as viewed in FIG. 1) and below the first hopper discharge opening 70. The first series of nozzles (as shown in greater detail in FIG. 7) includes a first set of two transverse rows 90 of relatively short transverse nozzles 92 arranged in an overlapping staggered relationship. The upper end of each nozzle has a transverse discharge slit 93, and the lower end of each nozzle is connected by a separate flexible tube 94 to the plenum chamber. Each tube 94 is sufficiently rigid to hold its respective nozzle upright, but will yield to permit the individual short nozzles to adjust to accommodate irregularities which may be present on the bottom of the tray passing over the nozzles. For commercial installations, I have found that it is relatively important that the gas nozzles make a close sliding fit against the bottom of the tray to insure proper perforation of the foam as described in detail below. A second set of nozzles 96 are located just to the right of the first set. The second set is substantially identical with the first, except that the transverse discharge slits 97 in the nozzles of the second set are slightly wider than those of the first set. By way of example, with a gas pressure of about 10″ of water in the plenum chamber 82, the slits in the first set are between about .010″ and about .025″, and the slits in the second set are about .010″ wider than those in the first set. With this arrangement, craters in the foam on the perforated trays passing over the nozzle are started by the gas jetted from the smaller slits, and are finished by gas jetted from the larger slits, so there is a minimum of spattering of foam.

A second series of two sets 100 of gas nozzles identical with the first series is disposed under the two-speed conveyor just to the right of the second hopper opening 70 in the foam spreading stage.

The two-speed conveyor carries a tray from left to right (as viewed in FIG. 1) onto a loaded tray conveyor 104, which is also driven by motor 24 through suitable drive linkage (not shown). The conveyor 104 is identical with the clean tray conveyor, and therefore is not described in detail. The loaded tray conveyor carries a tray against a second vertical solenoid-operated stop 106, which holds the tray just outside the entrance to a drying chamber 108 until the second stop is actuated by signal from the synchronizing circuit 52. A second tray rejector 110 is disposed under the loaded tray conveyor, to reject trays which are improperly spread with perforated foam. The construction of the second tray rejector is identical with that of the first tray rejector 30, and therefore is not repeated in detail.

Returning to the foam hoppers 56, the two-speed conveyor is first operated at a relatively high speed, which is equal to the speeds of the clean tray and loaded tray conveyors. As a clean tray passes from left to right under the foam hoppers, the forward edge of the tray engages a limit switch 112 which energizes the control circuit 66 to change the two-speed motor to a lower speed. The first limit switch 112 also generates a signal which starts the rollers in the foam hoppers rotating in a direction indicated by the arrows in FIG. 1, and energizes the solenoids 74 so that the plates 72 swing in a counter clockwise direction about their pivots 73 to open the hoppers so foam is discharged onto the top of the tray passing under them.

The foam can be of any suitable material, and can be prepared in any one of many different ways, such as those described in U.S. Patent 2,981,629.

The portions of foam overlying the perforations 11 in the tray are subjected to the gas blasts from the nozzles and are therefore displaced upwardly and laterally from the axis of the gas streams, transforming the mat of foam into a perforated mat. After the impingement of the gas stream, the foam has perforations 114 corresponding with the perforations in the tray. Since the perforations 114 have a generally conical shape with a mound 116 built up around each perforation, the action which occurs is referred to as "cratering." The foam usually has a consistency about that of shaving lather, therefore it tends to move laterally away from the axis of the gas stream rather than being projected upwardly away from the foam mat. In the practice of the invention, such variables as the size of the nozzles, the velocity of the gas stream, rate of movement of the tray, etc., are controlled to obtain a uniform cratering effect with a minimum of spattering.

Although not entirely critical, I have found that for many types of foam, the speed of the tray should be in the range of about 10 to 20 feet per minute to obtain uniform spreading and cratering. This rate is relatively slow compared to tray speed on the other conveyors, which may move at 60 feet per minute in a typical commercial installation. Therefore, it is preferred to use two or more hoppers as shown in FIG. 1 to obtain a relatively high spreading rate, even though the linear velocity of the tray is relatively low.

The forward edge of a tray leaving a two-speed conveyor contacts a limit switch 120 which energizes the control circuit to close the hopper openings, stop the hopper rollers, and return the two-speed motor to the faster speed.

The loaded tray with the perforated foam mat moves from left to right on the loaded tray conveyor 104 until it comes to rest against the second stop 106. The loaded tray conveyor belts slide under the bottom of the tray until the stop 106 is lowered by a signal from the synchonizing circuit 52. With a loaded tray against stop 106, a limit switch 122 is actuated to indicate to the synchronizing circuit that a loaded tray is ready to enter the drying oven 108. A cycle timer 124, which may be of conventional construction, periodically sends a signal to the synchronizing circuit 52 to advance trays along clean tray, two-speed, and loaded tray conveyors. The synchronizing circuit does not lower the first and second stops 14, 106, respectively, unless the limit switch 122 is actuated by the presence of a tray at stop 106. If a tray is in this position, a signal from the cycle timer causes the first and second stops to be lowered so that a tray passes under the foam hoppers as previously described, and so that a loaded tray moves from left to right on the loaded tray conveyor through elongated transverse swinging door 126 secured at its top edge to the oven by a pivot pin 127 over an entrance opening 128 and into the drying chamber. One end of the door carries a downwardly and rearwardly extending cam 129 which is engaged by the side of a forward moving tray to lift the door and permit the tray to enter without disrupting the perforated foam. Actuation of the first and second stops also turns on an in-feed motor 130, which drives an in-feed conveyor 132 that carries outwardly extending first and second tray pusher tabs 133, 134. As the first pusher tab moves in the direction of the arrow shown in FIG. 1, it engages the rear edge of a tray which previously had been held by stop 106, and pushes the tray forward into the lower end of the drying chamber. This movement continues until the second pusher tab 134 moves to the position previously occupied by the first pusher tab and actuates a limit switch 136, which turns off the in-feed motor through conventional circuitry in the synchronizing circuit. A limit switch 137 at the right of stop 106 prevents the stop from raising until the rear edge of the tray has passed over it.

Thus, the clean tray conveyor, two-speed conveyor, loaded tray conveyor, and in-feed conveyor make up a conveyor system for serially moving trays past the foam spreading station and into the drying chamber. The drying chamber includes a first pair of longitudinally spaced vertical endless lifting chains 140 (FIG. 2) disposed on one side of the entrance opening. A second pair of lifting chains 142 are mounted on the other side of the entrance opening. Each of the lifting chains includes outwardly extending cleats 143 on which trays rest so that they are lifted vertically in the drying chamber as the lifting chains move around sprockets 144. The lower sprockets within the lifting chain, are driven by a lifting motor 146 through shafts 147, bevel gears 148, and sprocket shafts 149 journalled through one side of the drying chamber. The lifting motor 146 is energized when limit switch 150 in the bottom of the bottom of the drying chamber is engaged by the forward edge of a loaded tray moved into the chamber by the in-feed conveyor. A lifting motor control circuit 152 supplies power to the lifting motor, which turns until it drives a cam switch 154 a pre-set distance to automatically stop the lifting motor. Preferably, the cam switch includes four cams so that the cam switch can be adjusted to lift the tray in any one of four different increments. For example, in one commercial embodiment the cam switch can be set so the trays are lifted 2, 3, 4, or 6 inches each time the lifting motor is energized. In this way, the trays are stepped uniformly up the drying chamber. Moreover, the adjustable increments permit variations in capacity and retention time in the drying chamber, as well as giving different air distribution for various drying requirements.

Referring to FIGS. 2 and 3, the shafts 149 at the upper end of the drying chamber each carry a reversing sprocket 160 around which is disposed a separate respective reversing chain 162. Each reversing chain is disposed around a respective drive sprocket 164 mounted on a separate respective horizontal rotatable drive shaft 166 in the upper end of a vertical cooling chamber 168 mounted adjacent the upper end of the drying chamber. Each shaft 166 in the cooling chamber carries a pair of longitudinally spaced sprockets 180. Directly below each upper shaft 166 is a lower shaft 182, each of which carries a pair of sprockets 184 disposed to be directly under a respective sprocket 180 on the upper shafts. Lowering chains 186 are disposed around each pair of the vertically aligned sprockets, and horizontal support strips 188 are secured to the lowering chains on common shafts to form horizontal supports for trays moved from the drying chamber through an upper opening 190 into the cooling chamber. Thus, each time a tray is lifted a given increment in the drying chamber, the trays in the cooling chamber are lowered by exactly the same amount.

Trays are moved horizontally from the upper end of the drying chamber into the upper end of the cooling chamber by a transfer conveyor 192, which includes a chain 194 disposed around sprockets 196 in the upper end of the drying chamber. A transfer conveyor motor 198 drives one of the sprockets. First and second outwardly extending tabs 199, 199′ are mounted on the chain 194. When a tray reaches the upper end of the drying chamber, the transfer conveyor motor is energized simultaneously with in-feed motor 130 so that the first transfer tab 199 pushes the top tray onto a pair of strips in the cooling chamber. A limit switch 200 in the top of the drying chamber acts as a safety device. If a tray is not transferred from the lifting chains, switch 200 keeps stop 14 in a raised position to prevent advance of trays.

Drying gas is circulated through the drying chamber, past the trays, and through the perforated foam, as shown best in FIGS. 4 and 10. The drying chamber includes four vertical posts 210 (FIG. 10). Removable horizontal baffles or panels 212 are secured to the posts to form the side walls of the chamber. A blower 214 supplies gas from an inlet duct 216 into a manifold space 218 at the bottom of the drying chamber. A horizontal dust filter 217 covers the upper end of the inlet duct. The periphery of the manifold space is surrounded by biological filters 220 so that germ-free air passes into a bottom plenum chamber 222. A horizontal perforated orifice plate 224 covers the top of the manifold space 218, and a first set of horizontal dampers 226 controls the amount of air passing from the top of the manifold space 218 and into the bottom of the drying chamber, where a first steam-heated heat exchanger 227 is mounted. Ordinarily, the first heat exchanger is operated at a relatively high temperature, say 200° F., so that the air or gas passing through it requires no biological filters. Air from the plenum chamber passes up through a first vertical duct 230 and a second vertical duct 232 on the right (as viewed in FIG. 4) side of the drying chamber. A second heat exchanger 234 at the upper end of the first duct 230 warms the air to an intermediate temperature, say 150° F., and then discharges it into an intermediate zone 236 which surrounds an intermediate portion of the heating chamber. Baffles around four sides of the drying chamber in the intermediate zone are removed so that the chamber has an inlet opening 238 to admit hot gas from the intermediate zone. This gas flows downwardly (countercurrently to upward movement of the trays) and out an exhaust opening 240 in a lower portion of the drying chamber. The exhaust opening is surrounded by an exhaust chamber 242, which is connected to an exhaust duct 244 adjacent the inlet duct 216. Gas passing up the second duct 232 travels through a third heat exchanger 246 at the upper end of 232, and discharges into an upper zone 248, which communicates with the open upper end of the drying chamber. Preferably, the third heat exchanger is operated at a lower temperature, say 130° F. The air from the upper end of the drying chamber also passes countercurrently to the movement of trays and leaves the chamber through exhaust opening 240. Thus, there are two zones of countercurrent gas flow in the upper part of the drying chamber, and one zone of concurrent flow in the lower end of the chamber.

Preferably, the amount of gas flowing into each duct 230 and 232 is controlled by separate dampers 250 disposed in each duct 230, 232 below each of the respective heat exchangers in those ducts. (Only one of the dampers 250 is shown.) (See FIG. 10.)

A recirculation damper 252 in a wall 254 separating the inlet duct from the outlet duct controls the amount of fresh gas entering the blower. With the recirculation damper 252 open as shown in FIG. 10, a variable quantity of exhaust gas can be recirculated. This has the advantage of conserving a large amount of heat. Another advantage in recirculating a portion of exhaust gas is that it reduces loss of aroma and flavor from the product during the drying operation. If desired, the inlet and exhaust ducts are completely closed so that there is full recirculation in the drying chamber. In this case, a dehumidifier (not shown) is used to remove moisture from the air. This type of operation has the advantage of permitting the economical use of a totally inert gas, such as nitrogen.

Referring to FIG. 2, a cooling gas, preferably an inert gas such as nitrogen, is recycled through the cooling chamber by a conventional recycle cooler 260 to pass around and through the dried perforated foam on the trays. Relatively warm gas is taken by line 262 from the upper portion of the cooling chamber, passed through the recycle cooler where it is chilled, and returned through a line 264 to the bottom of the cooling chamber, so the cooling gas flows countercurrent to the direction of tray movement in the cooling chamber. A portion of the gas passing through the recycle cooler is passed through a dehumidifier 266 by lines 268 to keep the relative humidity in the cooling chamber relatively low. The relative humidity of the cooling gas can vary widely with different operating processes, but ordinarily it is maintained in the range of 7% to 23%.

Cooled trays and dried foam products reaching the bottom of the cooling chamber are set by the lowering chains on a horizontal product removal conveyor 270, which is driven by a motor 272 to move a tray from right to left as viewed in FIG. 1.

A limit switch 273 at the bottom of the cooling chamber prevents the actuation of the synchronizing circuit as long as a tray is on the product removal conveyor and over the switch 273. With this arrangement, movement of the lowering chains is prevented if a tray has not been completely discharged from the cooling chamber. A stop 274 at the left end of the product removal conveyor restrains further movement of the tray until the stop is energized as described in detail below.

A tray is carried through an opening 276 in the lower portion of the cooling chamber into an enclosed product removal chamber 278. Lines 280 circulate gas, preferably an inert gas such as nitrogen, between the dehumidifier 266 and the product removal chamber to maintain the desired relative humidity. Makeup gas is added from a source 282 to keep the pressure in the removal chamber and cooling chamber slightly above atmospheric and above that in the drying chamber. With this arrangement, a small amount of gas flows from the cooling chamber into the drying chamber to prevent flow in the reverse direction. This is particularly important when a gas that is not inert, say air, is used in the drying chamber, and an inert gas is used in the cooling chamber. Oxidation usually is not a problem in drying because the vaporized water shrouds the product. However, on cooling, the dried foam tends to absorb gas, and it is usually desirable that the absorbed gas be inert to insure long storage life for the product. Near the end of the product removal chamber, four pairs of driving rollers 284 engage the side edges of the tray and force it positively over a pair of side supports 286. A transverse set of support rollers 288 support the bottom of the tray during this operation.

Figure 8:
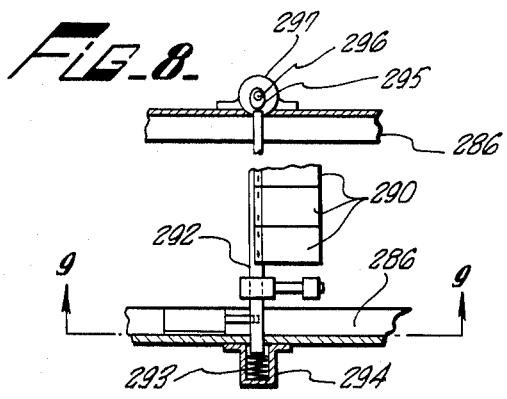
FIG. 8 is a fragmentary view taken on line 8—8 of FIG. 1.
Figure 9:
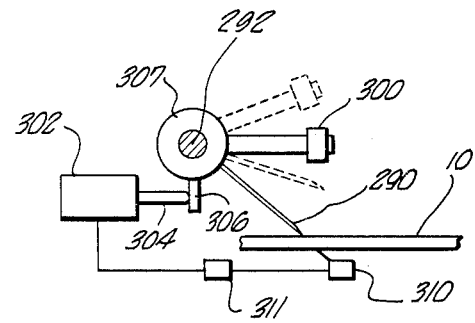
FIG. 9 is a view taken on line 9—9 of FIG. 8.

As shown best in FIG. 8, a series of downwardly and rearwardly extending doctor blades 290 are secured at their upper edges to a transverse rotatable and horizontal shaft 292. One end of the rotatable shaft 292 bears against a compression spring 293 in a spring housing 294. The other end of the shaft is urged by the spring against a cam 295 mounted on a shaft 296 driven by a motor 297 so that the doctor blades are reciprocated transversely with respect to the direction of tray movement underneath them. As shown in FIGS. 8 and 9, the shaft 292 includes a counterbalance weight 300 which urges the shaft to rotate in a clockwise (as viewed in FIG. 9) direction and move the doctor blades down toward the tray. A solenoid-operated cylinder 302 has a plunger 304 which engages a lifting pin 306 mounted on a collar 307 secured to the shaft 292. The solenoid 302 is actuated when a limit switch 310 is engaged by a tray as shown in FIG. 9. A control circuit 311 de-energizes the relay 302 and permits the plunger 304 to move to the left so that the blades 290 drop down from the dotted line position to the solid line position shown in FIG. 9, and are in a position to scrape the product from the top surface of the tray. When the blades are in the lower position, they also reciprocate so the product is cut as well as scraped off the top surface of the tray. After the tray passes limit switch 310, the solenoid is energized, causing the plunger 304 to move to the right and lift the blades to the dotted line position so a path is clear for the next tray.

An elongated and transverse rotatable scratcher brush 312 is mounted across the product removal chamber ahead of the doctor blades to scratch the surface of the dry foam and loosen the crust. The brush can be replaced by a fixed blade (not shown). A pair of elongated transverse and rotatable scrubbing brushes 314 are mounted across the product removal chamber after the blades to engage the top and bottom surfaces of the trays and scour remaining product from the trays. The scratching and scrubbing brushes are continuously rotated by conventional means (not shown).

A transverse suction housing 316 is disposed around the rotatable scratching brush, doctor blades, and scrubbing brushes, and is secured at one end (top, as viewed in FIG. 2) to the side of the produce removal chamber 278. The other end of the suction pickup housing terminates short of the opposite side of the product removal chamber. The suction housing includes a pair of elongated, transverse and horizontal inlet and exit slots 318, 319, respectively, to permit the trays to enter and leave the housing.

Inert gas is supplied under slight pressure by blower 320 through a line 321 into the product removal chamber, and enters the open end of the product pickup suction housing. Gas is sucked from the opposite end of the housing through a line 322, which discharges into a conventional cyclone separator 323 having an outlet connected by a duct 324 to the inlet side of dust filters 325, the outlet side of which are connected by a conduit 326 to the inlet of the blower 320. Thus, product is scratched, cut, scraped, and brushed from the trays, and is entrained in the form of particles by the gas stream and delivered to the cyclone separator and dust filters where it is separated in an inert atmosphere and prepared for packaging.

The drive rollers 284 force the cleaned tray out a swinging door 329 on an exit opening 330 in the left (as viewed in FIG. 1) end of the product removal chamber, and deliver the cleaned tray onto a tray discharge conveyor, which is driven by motor 332 to carry trays from right to left onto a tray elevator 334.

As shown best in FIGS. 1 and 2, the tray elevator includes a pair of horizontal and longitudinal fingers 336 which are secured at their left (as viewed in FIGS. 1 and 2) ends to the center part of a vertical frame 338 having guide wheels 340 which ride up and down on a vertical rail 342. A reversable elevator motor 344 is connected to a drum 346 around which is wound an elevator cable 347 attached at its lower end to the frame 338.

The elevator motor is actuated to raise the elevator when a limit switch 348 on the clean tray conveyor is operated by the removal of a tray from the switch 348 by the clean tray conveyor. The elevator then is raised to the position shown in FIG. 1 until it engages a limit switch 350, which sends a signal to an elevator control circuit 352, which stops the elevator motor. Thus, a clean tray passes from the tray discharge conveyor onto the elevator, and a loaded tray is released by stop 274 to pass through the product removal zone. A limit switch 356 at the discharge end of the product removal zone raises the stop 333 when the next cleaned tray starts out of the product removal zone. Limit switch 350 also sends a signal to a tray discharge control circuit 354 to allow solenoid actuated stops 274 and 333 to be released, providing a tray is in position at stop 333, as shown by depression of limit switch 356.

The elevator is lowered in response to a signal from a limit switch 357 that senses a tray in position on the elevator, and the foregoing cycle is repeated.

I claim:

1. In a process of dehydrating a foam which involves spreading the foam on the top surface of a plurality of perforated trays of uniform dimension, forcing gas upwardly through the perforations to perforate the foam, and drying the foam on the trays, the improvement which comprises
   (a) introducing the trays sequentially into a vertically oriented drying chamber, (b) moving the trays vertically through the drying chamber in vertically spaced relation one from the other, maintaining said chamber completely filled with the vertically spaced trays to provide apertured baffles, (c) removing a tray from one end of the drying chamber as each fresh tray is introduced at the opposite end of the chamber, (d) introducing a drying gas into the chamber at a plurality of vertically spaced locations while exhausting drying gas from the chamber at least at one location intermediate and spaced from the locations of introduction, and (e) causing substantially all of the drying gas to flow through the perforations in the foam covered trays disposed in the chamber and while the trays are moving through the chamber, whereby the trays function to establish separate drying zones within the chamber between locations of drying gas introduction.

2. In apparatus for dehydrating foam which includes a plurality of perforated flat metal trays, means for spreading foam as an evenly distributed layer on each successively employed one of said trays, means for directing a stream of gas upwardly through the perforations in said trays after deposition of foam thereon so as to blow craters in the foam, and means for exposing the foam to a drying gas, the improvement which comprises (a) a vertical drying column, (b) means for introducing trays each supporting a layer of cratered foam into one end of the drying column in uniform and predetermined succession, (c) means within the drying column for transporting the trays in predetermined vertically spaced relation through the column from the point of introduction to a point spaced vertically therefrom, said column being completely filled with the vertically spaced trays to provide apertured baffles therein which define separate drying zones, (d) means for introducing drying gas in the column at a plurality of vertically spaced locations and removing drying gas from the column at least at one location intermediate and spaced from the locations of introduction, said column and trays being structurally arranged to cause the substantially all of the drying gas to flow with a substantially uniform distribution through the trays disposed in the column, and (e) means for withdrawing the trays one at a time and successively from the column at a point spaced from the point of introduction, the removed trays supporting the dried residue of the foam originally layered thereon.

3. A process in accordance with claim 1 in which drying gas is introduced at the plurality of locations at different temperature.

4. A process in accordance with claim 1 in which drying gas is introduced at the plurality of locations at different rates of flow.

5. In apparatus for dehydrating foam which includes a plurality of perforated flat metal trays, means for spreading foam as an evenly distributed layer on each successively employed one of said trays, means for directing a stream of gas upwardly through the perforations in said trays after deposition of foam thereon so as to blow craters in the foam, and means for exposing the foam to a drying gas, the improvement which comprises (a) a vertical drying column, (b) means for introducing trays each supporting a layer of cratered forms into one end of the drying column in uniform and predetermined succession, (c) means within the drying column for transporting the trays in predetermined vertically spaced relation through the column from the point of introduction to a point spaced vertically therefrom, said column being completely filled with the vertically spaced trays to provide apertured baffles therein which define separate drying zones, (d) means for introducing drying gas into the column at a plurality of spaced locations and at differing temperatures and flow rates at the several locations, (e) means for removing drying gas from the column at least at one location intermediate and spaced from the locations of introduction, said column and trays being structurally arranged to cause the drying gas to flow with substantially uniform distribution through the trays disposed in the column, and (f) means for withdrawing the trays one at a time and successively from the column at a point spaced from the point of introduction, the removed trays supporting the dried residue of the foam originally layered thereon.

References Cited by the Examiner

UNITED STATES PATENTS

| | | | |
|---|---|---|---|
| 1,246,515 | 11/1917 | Young | 34—66 |
| 1,472,060 | 11/1923 | Evans | 15—309 |
| 1,475,523 | 11/1923 | Thompson | 15—309 |
| 1,504,854 | 8/1924 | Baker | 34—194 |
| 1,568,791 | 1/1926 | Aiken | 34—66 |
| 1,770,102 | 7/1930 | Edmunds | 34—66 |
| 1,881,063 | 10/1932 | Randolph | 34—194 |
| 2,277,073 | 3/1942 | Colbert | 62—63 |
| 2,365,769 | 12/1944 | Marshall | 34—62 X |
| 2,370,422 | 2/1945 | Reed. | |
| 2,392,054 | 1/1946 | McKinnis | 141—141 |
| 2,415,527 | 2/1947 | Peebles | 159—4 |
| 2,452,983 | 11/1948 | Birdseye | 34—13 X |
| 2,527,542 | 10/1950 | Gilson | 62—63 |
| 2,689,199 | 9/1954 | Pesce. | |
| 2,752,273 | 6/1956 | Mitchell | 134—21 |
| 2,775,825 | 1/1957 | Phillips | 34—242 |
| 2,783,787 | 3/1957 | Day et al. | 141—141 |
| 2,955,046 | 10/1960 | Morgan et al. | 99—206 |
| 2,970,088 | 1/1961 | Freeman | 195—142 |
| 2,981,629 | 4/1961 | Ginette et al. | 99—206 |
| 2,982,445 | 5/1961 | Koble | 222—55 |
| 2,993,625 | 7/1961 | Esval | 222—55 |
| 3,063,874 | 11/1962 | Black | 134—21 |

FOREIGN PATENTS

| | | |
|---|---|---|
| 509,533 | 7/1939 | Great Britain. |
| 940,946 | 11/1963 | Great Britain. |

OTHER REFERENCES

Drying and Dehydration of Foods, p. 19, by Von Loesecke, N.W., Reinhold Publishing Corp., 1943, N.Y.

WILLIAM F. O'DEA, *Primary Examiner.*

NORMAN YUDKOFF, CHARLES SUKALO,
*Examiners.*

J. SOFER, D. A. TAMBURRO, *Assistant Examiners.*